United States Patent [19]
Mahurin

[11] Patent Number: 6,035,310
[45] Date of Patent: Mar. 7, 2000

[54] METHOD AND CIRCUIT FOR PERFORMING A SHIFT ARITHMETIC RIGHT OPERATION

[75] Inventor: Eric W. Mahurin, Austin, Tex.

[73] Assignee: Advanced Micro Devices, Inc., Sunnyvale, Calif.

[21] Appl. No.: 08/995,119

[22] Filed: Dec. 19, 1997

[51] Int. Cl.[7] .................................................. G06F 5/01
[52] U.S. Cl. ............................................................ 708/209
[58] Field of Search ..................................... 708/209, 205

[56] References Cited

U.S. PATENT DOCUMENTS

| | | | |
|---|---|---|---|
| 4,472,788 | 9/1984 | Tamazaki | 708/209 |
| 4,490,809 | 12/1984 | Ueda et al. | 708/209 |
| 4,631,703 | 12/1986 | Sakamoto | 364/900 |
| 4,831,571 | 5/1989 | Tolumaru | 708/209 |
| 4,839,839 | 6/1989 | Tokumaru et al. | 708/209 |
| 4,872,128 | 10/1989 | Shimizu | 708/209 |
| 4,890,251 | 12/1989 | Nitta et al. | 708/209 |
| 5,379,240 | 1/1995 | Byrne | 708/209 |
| 5,416,731 | 5/1995 | Dang et al. | 708/209 |
| 5,553,010 | 9/1996 | Tanihira et al. | 708/209 |
| 5,671,166 | 9/1997 | Omote | 708/209 |
| 5,726,926 | 3/1998 | Makino | 708/209 |
| 5,822,231 | 10/1998 | Wong et al. | 708/209 |
| 5,844,828 | 12/1998 | Fujimura et al. | 708/209 |

*Primary Examiner*—David H. Malzahn
*Attorney, Agent, or Firm*—Conley, Rose & Tayon, P.C.; Eric A. Stephenson

[57] ABSTRACT

A method and circuit for performing a shift arithmetic right operation as disclosed. The circuit employs and the method uses an inverter which is configured to receive a sign bit of a first n bit operand which is subject to a shift arithmetic right instruction. The inverter is configured to generate a one bit operand representing a logical inversion of the sign bit of the first n bit operand. A shifter is also provided to receive the first n bit operand. The shifter shifts the first n bit operand according to a shift count c provided by the shift arithmetic right instruction. The shifter generates a second n bit operand which represents the first n bit operand shifted by c bit. A sign fill circuit is provided to receive the one bit operand from the inverter and the second n bit operand from the shifter. The sign fill circuit generates a result operand having n bits from the one bit operand in the second n operand. The result operand represents the first operand shifted by c bits and sign filled.

24 Claims, 5 Drawing Sheets

METHOD AND CIRCUIT FOR PERFORMING A SHIFT ARITHMETIC RIGHT OPERATION

BACKGROUND OF THE INVENTION

1. Field of the Invention

This invention relates to shifters and more particularly to a method and circuit for sign fill shifting of operands.

2. Description of the Relevant Art

Microprocessors determine the speed and power of personal computers, and a growing number of more powerful machines, by handling most of the data processing in the machine. Microprocessors typically include at least three functional groups: the input output unit (I/O unit), the control unit, and the arithmetic-logic unit (ALU). The I/O unit interfaces between external circuitry and the ALU and the control unit. I/O units frequently include signal buffers for increasing the current capacity of a signal before the signal is sent to external components. The control unit controls the operation of the microprocessor by fetching instructions from the I/O unit and translating the instructions into a form that can be understood by the ALU. In addition, the control unit keeps track of which step of the program is being executed. The ALU handles the mathematical computations and logical operations that are performed by the microprocessor. The ALU executes the decoded instructions received from the control unit to modify data contained in registers within the microprocessor.

Division is an important computation to be performed by any ALU. Division in binary mathematics is accomplished by shifting right the operand to be divided by a shift count equal to the divisor. For example, dividing an operand by four is accomplished by shifting the operand right by two bits. Division can be performed on signed or unsigned operands. For signed operands the most significant bit is typically the sign bit. With respect to unsigned operands, division is performed by shifting with zero fill. With respect to signed operands, division is accomplished by shifting with signed fill.

A frequent logical operation to be performed by ALUs is the "shift arithmetic right" instruction which is part of the x86 instruction set. The shift arithmetic right instruction in essence causes a signed operand to be right shifted with sign fill. Shift arithmetic right, in essence, equates to division with sign fill.

FIG. 1 is a block diagram of relevant portions of an ALU of the prior art including a shift arithmetic right (SAR) circuit 10 for executing shift arithmetic right or sign division instructions. SAR 10 includes a fan out circuit 12 coupled to a right double shifter 14.

Right double shifter 14 includes a set of lower inputs (not shown) configured to receive a multiple bit operand ($a_{n:1}$), subject to a shift arithmetic right instruction or a signed division operation, and a second set of upper inputs (not shown) coupled to the output of the fan out circuit 12.

Fan out circuit 12 includes an input node configured to receive the most significant bit (i.e., the sign bit) of $a_{n:1}$. Fanout circuit is coupled to a control node 18 which receives an enable signal from the control unit (not shown). In response to fan out circuit 12 receiving the enable signal, fan out circuit 12 operates to produce an m bit operand ($e_{m:1}$) each bit of which equates to the sign bit of the input operand $a_{n:1}$. The m bit operand of the fan out circuit 12 is provided to the upper input nodes of the right double shifter 14 concurrently with the input operand $a_{n:1}$ to be shifted.

Right double shifter 14 is coupled to shift count input node(s) 22. In response to receiving the m bit sign operand $e_{m:1}$, $a_{n:1}$, and a shift count at shift count input node(s) 22, right double shifter 14 operates to generate an n bit result operand $r_{n:1}$ representing the input operand $a_{n:1}$ right shifted by the shift count and sign filled. The combination of fan out circuit 12 and right double shifter 14 operates to execute shift arithmetic right instructions or operand division instructions.

One of ordinary skill in the art will recognize that fan out circuit 12 introduces signal delay to the critical path of the ALU containing the SAR 10. For any shift arithmetic right operation, operation of double right shifter 14 must be delayed until arrival of the m bit operand $e_{m:1}$ from fan out circuit 12. This delay may require SAR circuit 10 to operate in more than one clock cycle. Moreover, one of ordinary skill in the art will recognize that fan out circuit 12 must be able to provide the upper input nodes of right double shifter 14 with m bit operands $e_{m:1}$ of multiple size in order to accommodate sign fill shifting of input operands of multiple size. The ability of fan out circuit 12 to provide double right shifter 14 with multiple sized operands $e_{m:1}$ requires fan out circuit 12 to be complex and capable of operating in several modes according to differing enable signals.

SUMMARY OF THE INVENTION

The problems identified above are in large part addressed by a circuit and method for performing a shift arithmetic right operation wherein the circuit and method employs a sign fill circuit. An inverter is provided and configured to receive a sign bit of a first n bit operand which is subject to a shift arithmetic right instruction. The inverter is configured to generate a one bit operand representing a logical inversion of the sign bit of the first n bit operand. A shifter is also provided to receive the first n bit operand. The shifter shifts the first n bit operand according to a shift count c provided by the shift to arithmetic right instruction. The shifter generates a second n bit operand which represents the first n bit operand shifted by c bits. The sign fill circuit is provided to receive the one bit operand from the inverter and the second n bit operand from the shifter. The sign fill circuit generates a result operand having n bits from the one bit operand and the second n bit operand. The result operand represents the first operand right shifted by c bits and sign filled.

The sign fill circuit operates by first generating a third n bit operand. Each of the (c+1) most significant bits of the third n bit operand equate to a logical inversion of the sign bit provided by the inverter. The remaining (n−c−1) bits of the third n bit operand equate to a logical zero. The sign fill circuit then logically complements the third n bit operand to generate a fourth n bit operand. Finally, the sign filled circuit logically ORs the fourth n bit operand with the second n bit operand to produce the n bit result operand.

One advantage of the present invention is that it executes shift arithmetic right instructions without employing the complex fan out circuit of the prior art.

Another advantage of the present invention is that it can allow the fan out circuit to be removed from the critical path of an ALU employing the present invention.

BRIEF DESCRIPTION OF THE DRAWINGS

Other objects and advantages of the invention will become apparent upon reading the following detailed description and upon reference to the accompanying drawings in which.

Figure 1:
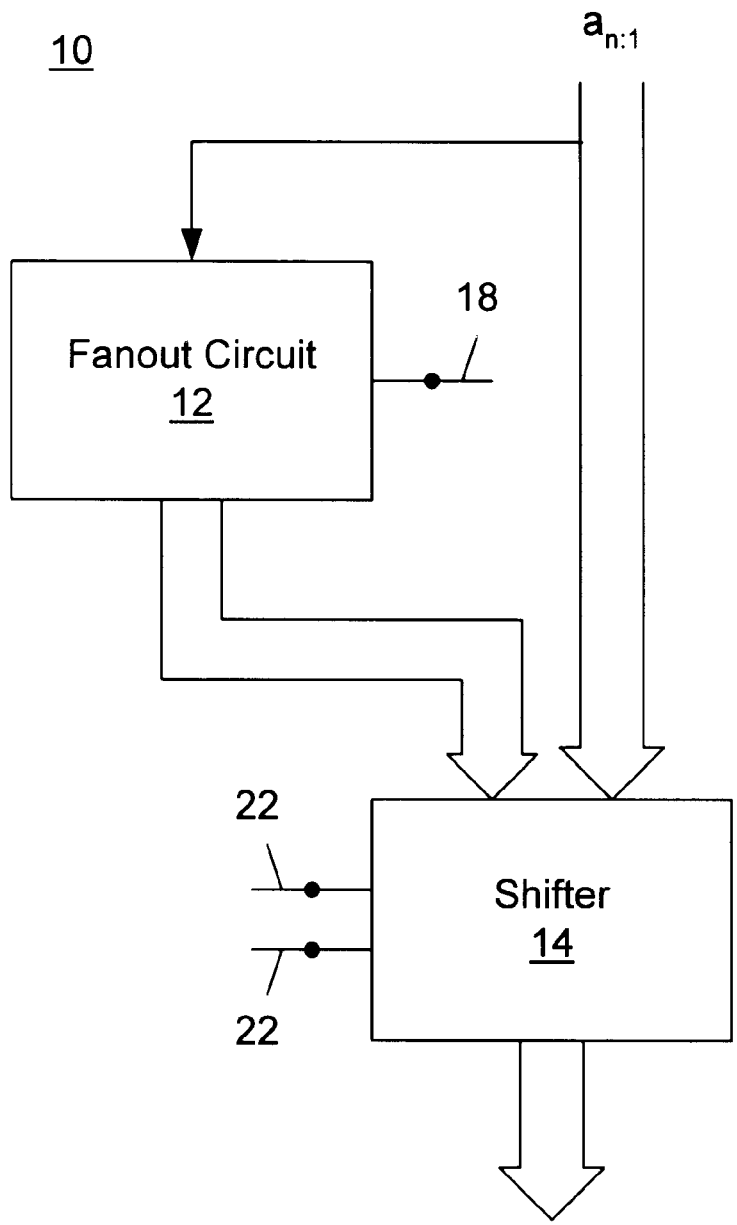
FIG. 1 is a block diagram of relevant portions of a prior art ALU.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
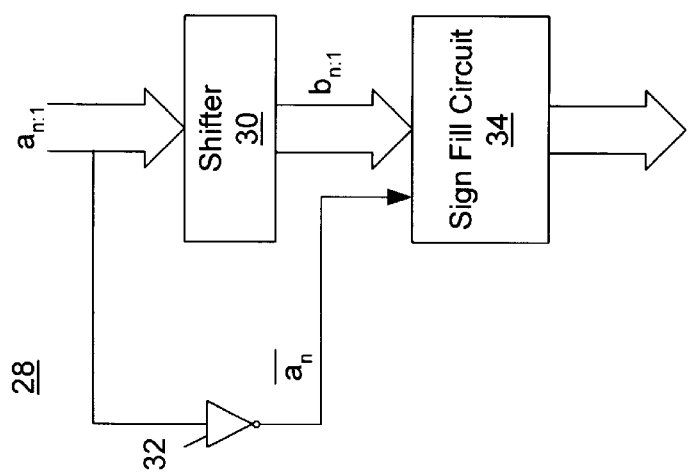
FIG. 2 is a block diagram of relevant portions of an ALU employing the present invention.

FIG. 2 is a block diagram of relevant portions of an ALU employing the present invention. Specifically, FIG. 2 shows a shift arithmetic right (SAR) circuit 28 having a double right shifter 30 coupled to an inverter 32 and a sign fill circuit 34. While the present invention is being described with reference to a double right shifter 30, it is understood that the invention should not be limited thereto. For example, the invention could be implemented with a double left shifter which can produce a right shifted operand when the shift count is negated.

Double right shifter 30 is coupled to receive a shift count (c) provided by the shift arithmetic right (SAR) instruction to be executed. Double right shifter 30 has a lower set of input nodes (not shown) configured to receive a first n bit operand ($a_{n:1}$) identified by the SAR instruction and subject to the SAR operation. Double right shifter 30 further includes an upper set of input bits. In one embodiment of the present invention, each upper input node is provided with a logical zero. Thus, in one embodiment, double right shifter 30 operates as a zero fill right shifter. In response to receiving the first n bit operand and the shift count, double right shifter 30 generates a second n bit operand which represents the first n bit operand right shifted by c bits and zero filled.

Inverter 32 is configured to receive the most significant bit (the sign bit) of the first n bit operand. Inverter 32 includes an output coupled to an input of sign fill circuit 34. Thus, sign fill circuit 34 receives the inverted sign bit of the first n bit operand.

Sign fill circuit 34 is configured to receive the shifted or second n bit output provided by double right shifter 30 and the inverted sign bit provided by inverter 32. In response to receiving the second n bit operand from double right shifter 30 and the inverted sign bit from inverter 32, sign fill circuit 34 generates a result n bit operand ($r_{n:1}$) which represents the result of performing a SAR operation on the first n bit operand. In other words, the n bit result operand represents the first n bit operand $a_{(n:1)}$ right shifted and sign filled.

Figure 3:
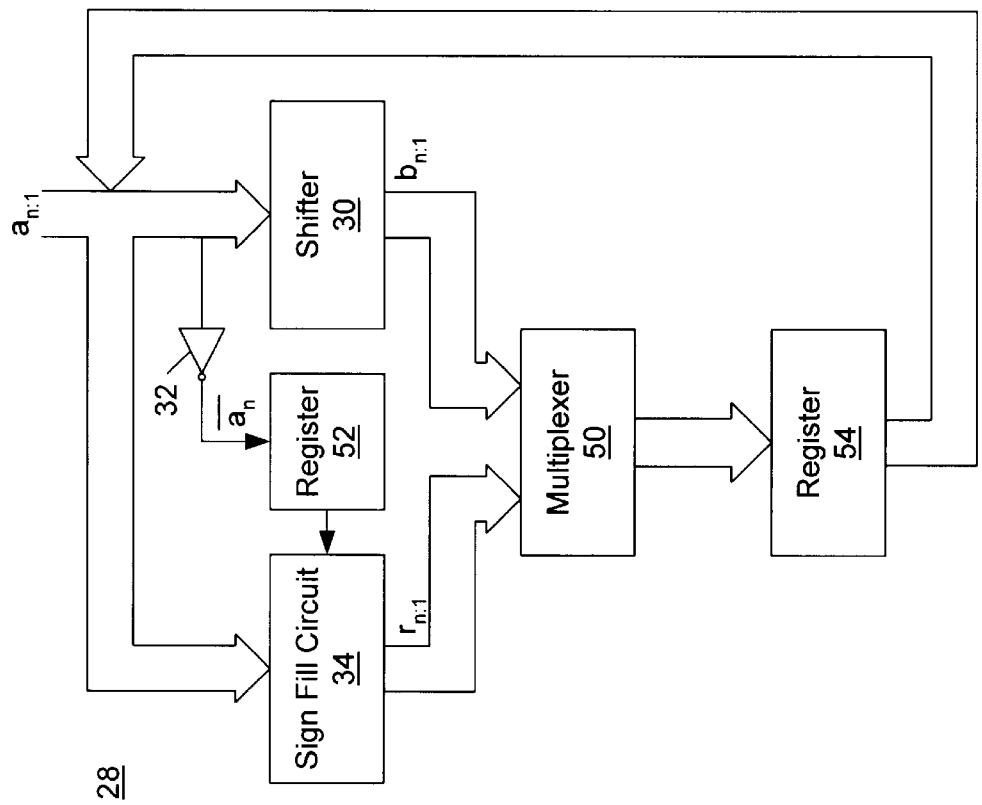
FIG. 3 is a block diagram of relevant portions of an ALU employing the present invention.

FIG. 3 is a block diagram of an alternative embodiment of a SAR circuit 28 employing the present invention. More specifically, FIG. 3 shows SAR circuit having the double right shifter 30, inverter 32, and sign fill circuit 34 of FIG. 2, in addition to a multiplexer 50, a first storage register 52, and a second storage register 54. First storage register 52 is coupled between the output of inverter 32 and sign fill circuit 34.

First storage register is configured to store the inverted sign bit provided by inverter 32. Again, it is noted that the contents of first storage device 52 represents the inversion of the sign bit of the first n bit operand. The inverted sign bit stored in first storage register 52 is subsequently used by sign fill circuit 34 in generating the result operand $r_{n:1}$ described above.

Multiplexer 50 is coupled to the outputs of double right shifter 30 and sign fill circuit 34. Multiplexer 50 is configured to receive a control signal for selecting either the output of the SAR circuit 34 or the output of double right shifter 30.

The output of multiplexer 50 is coupled to second storage register 54. Second storage register 54 operates to store the n bit result operand of sign fill circuit 34 or the second n bit operand generated by double right shifter 30 depending upon selection by multiplexer 50. Second storage register 54 is also coupled to the inputs of double right shifter 30 and sign fill circuit 34. In operation, the first n bit operand $a_{n:1}$ which is identified by an SAR instruction, is provided to the inputs of double right shifter 30. In addition, the most significant bit of the first n bit operand $a_{n:1}$ is provided to inverter 32. SAR circuit 28 shown in FIG. 3 operates in two cycles. In the first cycle, double right shifter 30 is enabled to shift operand $a_{n:1}$ right by the shift count c specified by the SAR instruction. It is noted, again, that $a_{n:1}$, is right shifted with zero fill. Double right shifter 30 outputs the shifted second n bit operand to multiplexer 50. In response to multiplexer 50 receiving a first signal, multiplexer 50 outputs the result of shifter 30 for storage in second storage register 54. In the second cycle, the second n bit operand is provided to the sign fill circuit 34 from second storage register 54. As an aside, during the first cycle, first storage circuit 52 operates to store the inversion of the most significant bit of the first n bit operand $a_{n:1}$. In the second cycle, sign fill circuit 34 generates the n bit result operand as a function of the inverted sign bit stored in first storage register 52 and the second n bit operand stored in second storage register 54. The output of sign fill circuit 34 is provided to multiplexer 50. Multiplexer 50, operating in accordance to a second control signal, selects the n bit result operand for storage in second storage register 54.

It is noted that in FIG. 3, as opposed to FIG. 2, the sign fill circuit 34 is removed from the critical path of the SAR circuit 28 and thus the ALU employing the SAR circuit 38. This allows the shifter 30 to be used for non SAR operations, i.e., standard shift right with zero fill instructions.

Figure 4:
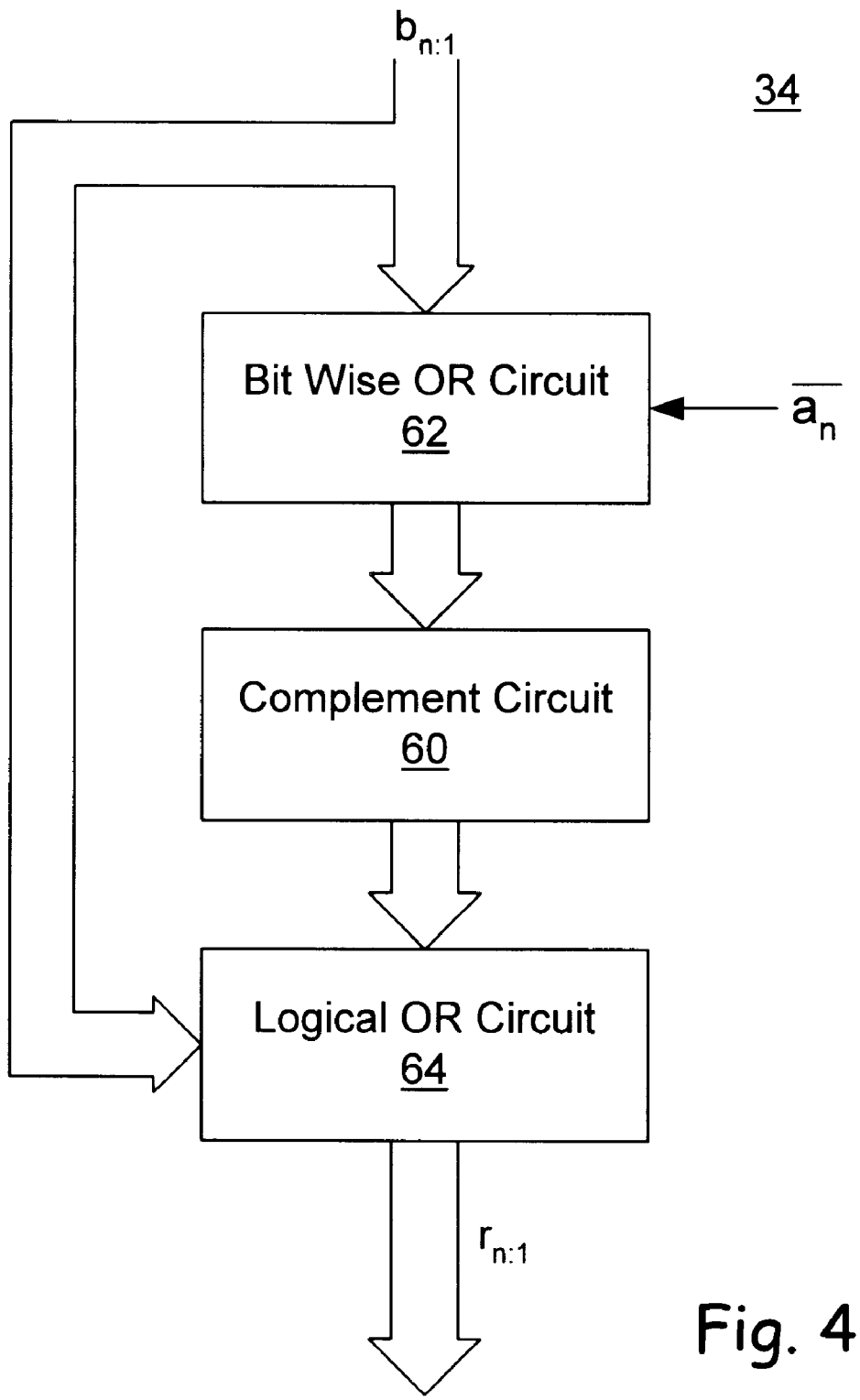
FIG. 4 is a block diagram of a sign fill circuit employing the present invention.

FIG. 4 is a block diagram of the sign fill circuit 34 of either FIGS. 2 or 3. Sign fill circuit 34 of FIG. 4 shows a complement circuit 60 coupled between a bit wise ORing circuit 62 and a logical ORing circuit 64. Bit wise ORing circuit 62 is configured to receive, directly or indirectly, the inverted sign bit provided by inverter 32 discussed above. Additionally, bit wise ORing circuit 62 is configured to receive the second n bit operand ($b_{n:1}$), directly or indirectly, from double right shifter 30 described above. In response to receiving the inverted sign bit and the second n bit operand, bit wise ORing circuit generates a third n bit operand ($c_{n:1}$) or a bit wise ORed operand, wherein each of the (c+1) most significant bits of the third n bit operand equate to the inverted bit generated by inverter 32 described above. The inverted bit, again, represents the logical inversion of the sign bit of the first n bit operand. The remaining (n−c−1) bits of the third n bit operand equate to a logical zero. The third n bit operand is provided to complement circuit 60 which logically complements the third n bit operand which in turn is provided to the logical ORing circuit 64. The logical ORing circuit receives the complemented third n bit operand and the second n bit operand (the shifted first n bit operand) provided, indirectly or directly, by the double right shifter 30, and generates the n bit result bit operand as a function thereof.

Figure 5:
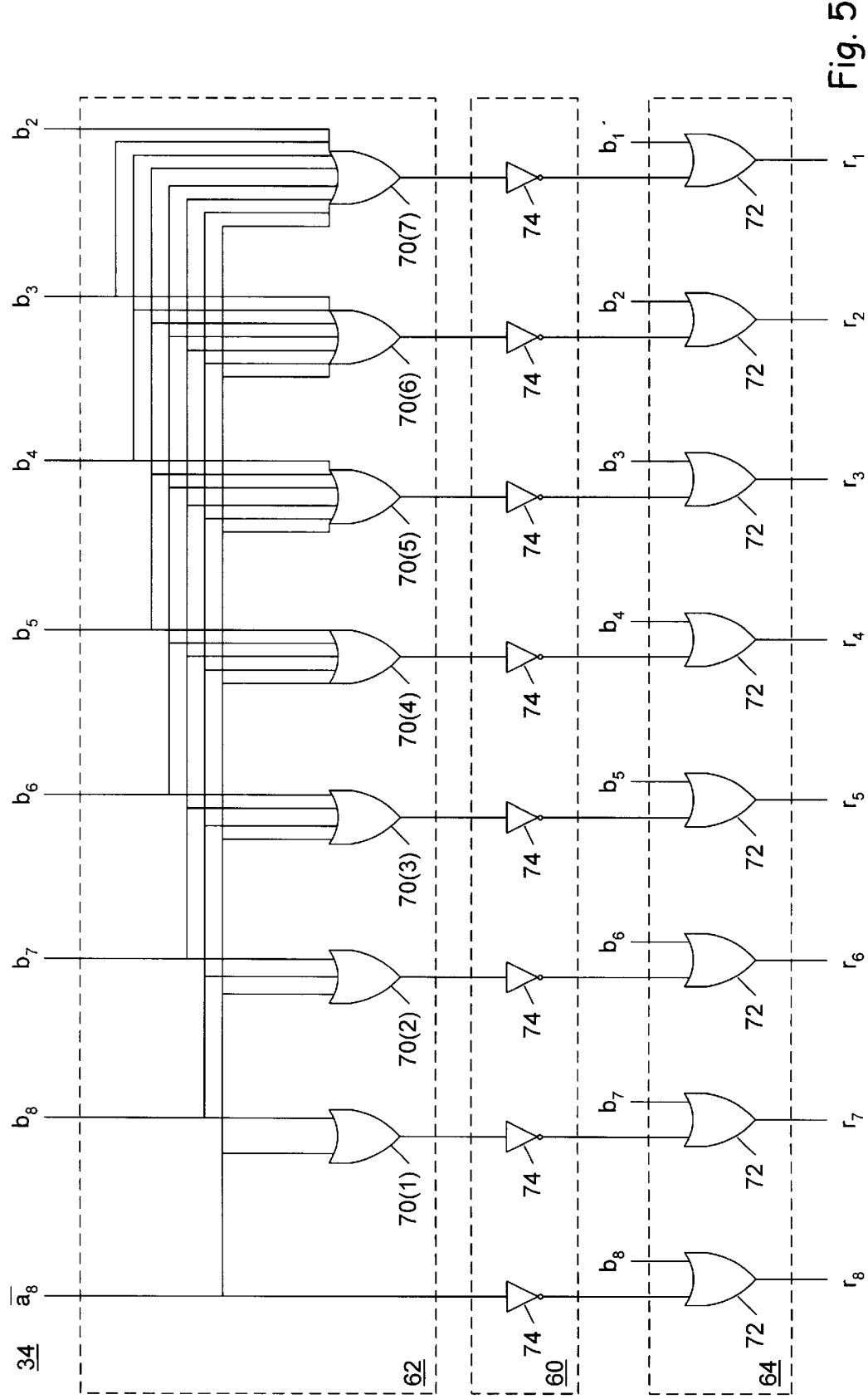
FIG. 5 is a schematic diagram of one embodiment of the sign fill circuit shown in FIG. 4.

FIG. 5 is a schematic diagram of the bit wise OR circuit 62, the complement circuit 60, and logical ORing circuit 64 shown in FIG. 4. More particularly, bit wise OR circuit 62 includes a plurality of OR gates 70, logical ORing circuit 64 includes a set of OR gates 72, and complement circuit 60 includes a set of inverters 74. The sign fill circuit shown in FIG. 5 is configured for operating on a second n bit operand $b_{n:1}$ where n is defined as eight, it being understood that the present should not be limited thereto. Moreover, the sign fill circuit of the present invention is not intended to be limited to that shown in FIGS. 4, 5 or 6.

As noted above, bit wise ORing circuit 62 includes a set of OR gates 70. OR gates 70 increase in size from a two input OR gate 70 (1) to eight input OR gate 70(7). Each OR gate 70 is coupled to receive the inverted sign bit and selective bits of the second eight bit operand $b_{8:1}$. For example, OR gate 70(7) is coupled to receive the seven most significant bits of the second eight bit operand in addition to the inverted sign bit. OR gate 70(1) is coupled to receive the inverted sign bit and the most significant bit of the second eight bit operand. Bit wise ORing circuit 62 generates an eight bit operand which is provided to the complement circuit 60 as the third eight bit operand.

Complement circuit 60 comprises eight inverters 74 coupled to receive the outputs of OR gates 70 of bit wise OR circuit 62. Inverters 74 operate to logically invert the third eight bit operand provided by OR gates 70.

Each of the OR gates 72 of ORing circuit 64 has a pair of inputs one of which is coupled to receive a selective bit from the second eight bit operand, the other of which is coupled to receive the a selective bit from the complemented third eight bit operand. OR gates 72 are configured to generate at their output the eight bit result operand.

Figure 6:
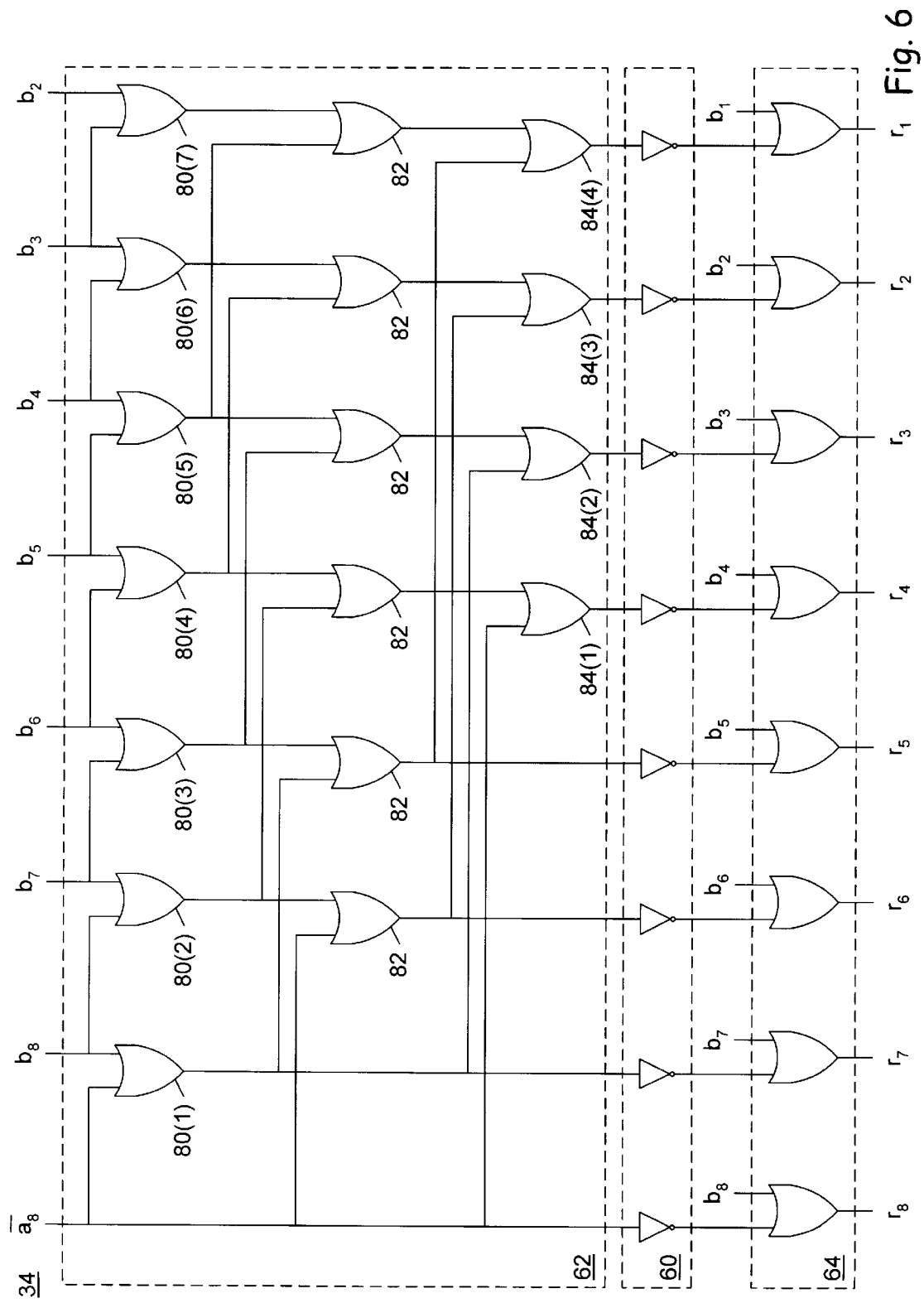
FIG. 6 is an alternative embodiment of the sign fill circuit shown in FIG. 4.

FIG. 6 is a schematic diagram of an alternative embodiment of the sign fill circuit 34 of FIG. 4. The sign fill circuit shown in FIG. 6 is configured to operate on a second eight bit operand provided by shifter 30 and the inverted sign bit provided by inverter 32. Again, it is understood that the embodiment shown in FIG. 6 should not be limited thereto. Bit wise OR circuit 62 of FIG. 6 includes a plurality of OR gates 80–84 having a pair of inputs and an output. A first set of OR gates 80 are configured to receive selected bit(s) of the second eight bit operand or the most significant bit of the second eight bit operand and the inverted sign bit. A second set of OR gates 82 are configured to receive selected outputs of OR gates 80 or the output of OR gate 80(1) and the inverted sign bit. A third set of OR gates are configured to receive selected outputs of OR gates 82 or the output of OR gate 82(1) and the inverted sign bit. Inverting and logical ORing circuits 60 and 64 of FIGS. 5 and 6 are identical.

The sign fill circuits 34 shown in FIGS. 5 and 6 operate in accordance with the following binary principles. More particularly, shown below and represented as expression (1) is inverted sign bit of the first eight bit operand concatenated with the zero filled, second eight bit operand provided by shifter 30. It is noted that the second eight bit operand concatenated to form expression (1), represents the first eight bit operand shifted right by three bits.

$$\overline{a_8}\ 0\ 0\ 0\ a_8\ a_7\ a_6\ a_5\ a_4 \tag{1}$$

A bit wise ORing of expression (1) by the bit wise circuit 62 of either FIG. 5 or FIG. 6, produces expression (2) below:

$$\overline{a_8}\ \overline{a_8}\ \overline{a_8}\ \overline{a_8}\ 1\ 1\ 1\ 1 \tag{2}$$

Each mth bit of expression (2) is generated by ORing the m most significant bits of expression (1) in accordance with a bit wise OR operation. Expression (3) below shows a logical inversion of Expression (2) above.

$$a_8\ a_8\ a_8\ a_8\ 0\ 0\ 0\ 0 \tag{3}$$

When each of the eight most significant bits of Expression (3) is ORd with the corresponding bit of the second eight bit operand, the result equals Expression (4) below which represents the eight bit result operand, or the first eight bit operand shifted right by three bits and sign filled.

$$a_8\ a_8\ a_8\ a_8\ a_7\ a_6\ a_5\ a_4 \tag{4}$$

While the present invention has been described with reference to particular embodiments, it will be understood that the embodiments are illustrative and the invention scope is not so limited. Any variations, modifications, additions and improvements to the embodiment described are possible. These variations, modifications, additions and improvements may fall within the scope of the invention as detailed within the following claims.

What is claimed is:

1. A method of generating a sign filled, right shifted operand, the method comprising the steps:

shifting a first n bit operand by c bits to generate a second n bit operand, wherein the first n bit operand includes a sign bit;

generating a third n bit operand, wherein each of the (c+1) most significant bits of the third n bit operand equate to a logical inversion of the sign bit, and wherein the remaining (n−c−1) bits of third n bit operand equate to a logical one;

logically complementing the third n bit operand to generate a fourth n bit operand, and;

logically ORing the fourth n bit operand with the second n bit operand.

2. The method of claim 1 wherein the second n bit operand is bit wise logically ORed with the fourth bit operand.

3. The method of claim 1 wherein the most significant bit of the first n bit operand defines the sign bit.

4. The method of claim 1 wherein each of the c most significant bits of the second operand represent logical zero.

5. The method of claim 1 wherein the first n bit operand is shifted right by c bits.

6. A method of generating a sign filled, right shifted operand, the method comprising the steps:

shifting a first n bit operand by c bits to generate a second n bit operand, wherein the most significant bit of the first n bit operand defines a sign bit;

generating a first (n+1) bit operand by concatenating the second n bit operand with a one bit operand representing a logical inversion of the sign bit of the first n bit operand;

generating a third n bit operand, wherein the mth most significant bit of the third n bit operand represents a logical OR of the m most significant bits of the first (n+1) bit operand;

complementing the third n bit operand to generate a fourth n bit operand, and;

logically ORing the fourth n bit operand with the second n bit operand.

7. The method of claim 6 wherein the fourth n bit operand is bit wise logically ORed with the second n bit operand.

8. The method of claim 6 wherein the first n bit operand is shifted to the right.

9. The method of claim 6 wherein the first n bit operand is zero filled shifted to generate the second n bit operand.

10. A shift arithmetic right circuit comprising:

an inverter configured to receive a sign bit of a first n bit operand, wherein the inverter configured to generate a one bit operand representing a logical inversion of the sign bit;

a shifter configured to receive the first n bit operand, wherein the shifter is configured to shift the first n bit operand by c bits to generate a second n bit operand, and;

a circuit configured to receive the one bit operand and the second n bit operand, wherein the circuit is configured to generate an output operand having n bits, wherein the n bit output operand is generated from the one bit operand and the second n bit operand, wherein the n bit output operand represents the first operand shifted to the right and sign filled.

11. A shift arithmetic right circuit comprising:

a shifter configured to receive a first n bit operand and configured to shift the first n bit operand by c bits to generate a second n bit operand, wherein the first n bit operand includes a sign bit;

a first circuit coupled to receive the second n bit operand and configured to generate a third n bit operand as a function of the received second n bit operand, wherein each of the (c+1) most significant bits of the third n bit operand equate to a logical inversion of the sign bit, and wherein each of the remaining (n−c−1) bits of the third n operand equate to a logical one;

a second circuit coupled to receive the third n bit operand, wherein the second circuit is configured to logically complement the third n bit operand to generate a fourth n bit operand, and;

a third circuit coupled to receive the fourth bit operand and the second n bit operand, wherein the third circuit is configured to logically OR the fourth n bit operand and the second n bit operand.

12. The shift arithmetic right circuit of claim 11 wherein the first circuit is coupled to the shifter and comprises m OR gates, n OR gates of which have at least two inputs each of which is configured to receive a bit of the first n bit operand.

13. The shift arithmetic right circuit of claim 12 wherein m equals n.

14. The shift arithmetic right circuit of claim 12 wherein the second circuit is coupled to the first circuit and comprises n inverting gates each having an input coupled to receive a bit of the third n bit operand.

15. The shift arithmetic right circuit of claim 12 wherein the third circuit is coupled to the second circuit and comprises n OR gates each having first and second inputs, wherein the first input of each OR gate of the third circuit is configured to receive one bit of the second n bit operand, and the second input of each OR gate of the third circuit is configured to receive one bit of the fourth n bit operand.

16. The shift arithmetic right circuit of claim 11 wherein the shifter is configured to shift the first operand right by c bits.

17. The shift arithmetic right circuit of claim 11 wherein the c most significant bits of the second operand represent logical zero.

18. A shift arithmetic right circuit comprising:

an inverter configured to receive a sign bit of a first n bit operand, wherein the inverter generates a one bit operand representing an inversion of the sign bit of the first n bit operand;

a shifter configured to receive the first n bit operand and configured to shift the first n bit operand to generate a second n bit operand;

a first circuit configured to receive the second n bit operand and the one bit operand, wherein the first circuit is configured to generate a first (n+1) bit operand by concatenating the n bit shifted operand with the one bit operand;

a second circuit configured to receive the first (n+1) bit operand, wherein the second circuit is configured to generate a third n bit operand, wherein the mth most significant bit of the third n bit operand represents a logical OR of the m most significant bits of the first (n+1) bit operand;

a third circuit configured to receive the third n bit operand, wherein the third circuit is configured to complement the third n bit operand to generate a fourth n bit operand, and;

a fourth circuit configured to receive the fourth n bit operand and the second n bit operand, wherein the fourth circuit is configured to logically OR the fourth n bit operand with the second n bit operand.

19. The shift arithmetic right circuit of claim 18 wherein the second circuit comprises m OR gates, n OR gates of which have at least two inputs each of which is configured to receive a bit of the first n bit operand.

20. The shift arithmetic right circuit of claim 19 wherein m equals n.

21. The shift arithmetic right circuit of claim 18 wherein the third circuit comprises n inverting gates each having an input coupled to receive a bit of the third n bit operand.

22. The shift arithmetic right circuit of claim 18 wherein the third circuit is coupled to the second circuit and comprises n OR gates each having first and second inputs, wherein the first input of each OR gate of the third circuit is configured to receive one bit of the second n bit operand, and the second input of each OR gate of the third circuit is configured to receive one bit of the fourth n bit operand.

23. The shift arithmetic right circuit of claim 18 wherein the shifter is configured to shift the first operand right by c bits.

24. The shift arithmetic right circuit of claim 23 wherein the c most significant bits of the second operand represent logical zero.

* * * * *